March 24, 1970     A. F. HULVERSON     3,502,345
SLIDING VEHICLE SUBFRAME
Filed Feb. 26, 1968     3 Sheets-Sheet 1
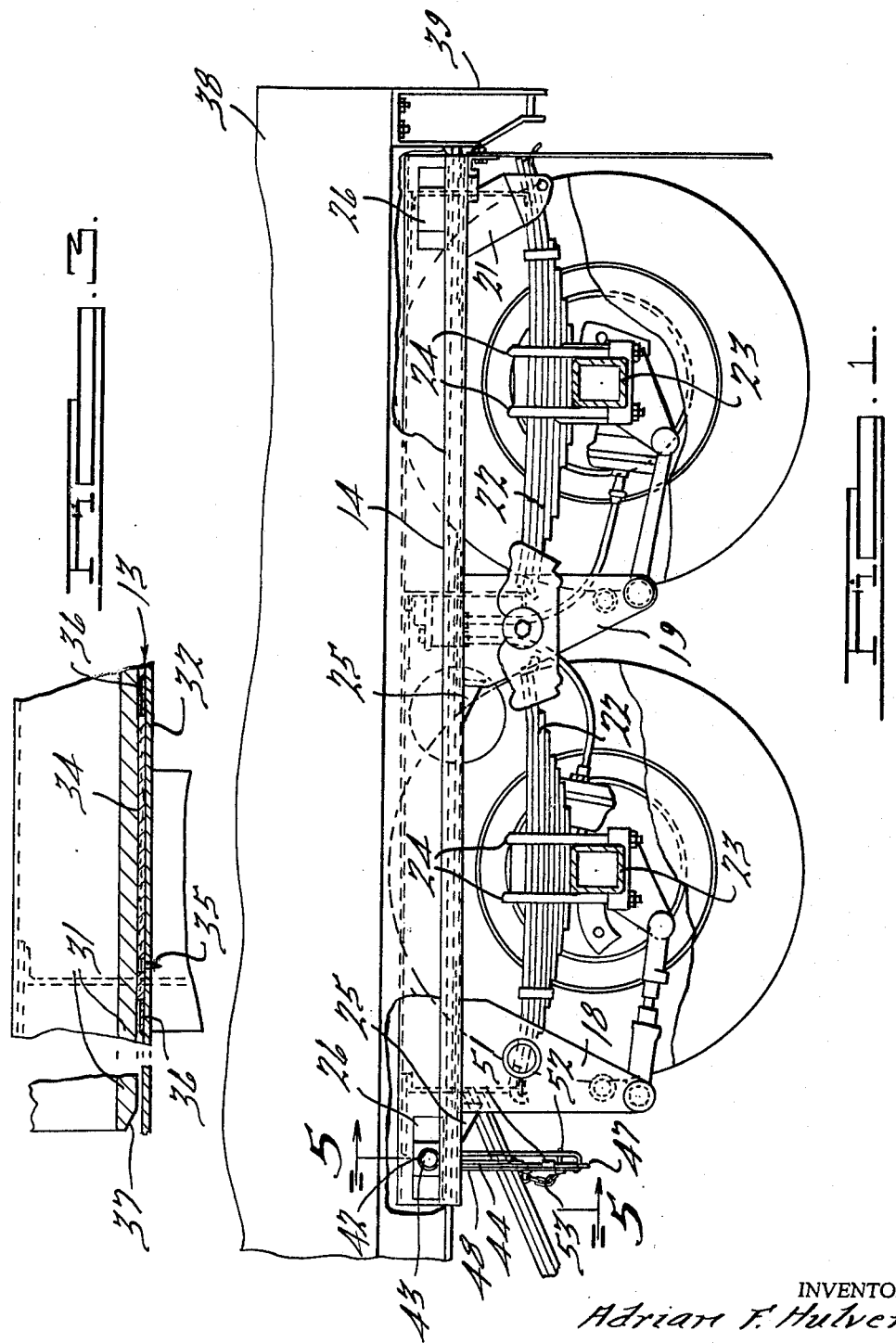
INVENTOR.
Adrian F. Hulverson
BY
Harness, Dickey & Pierce
ATTORNEYS

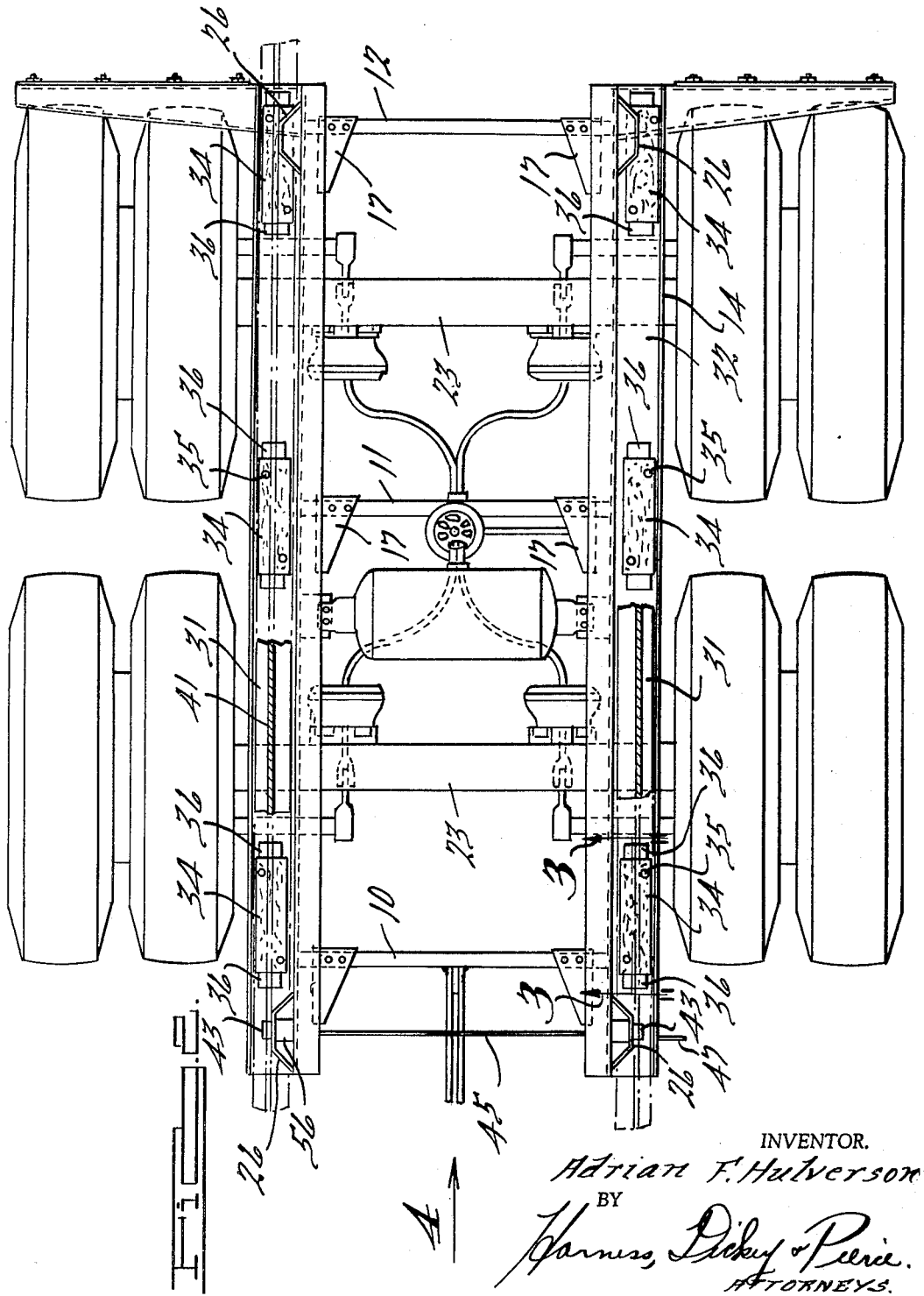

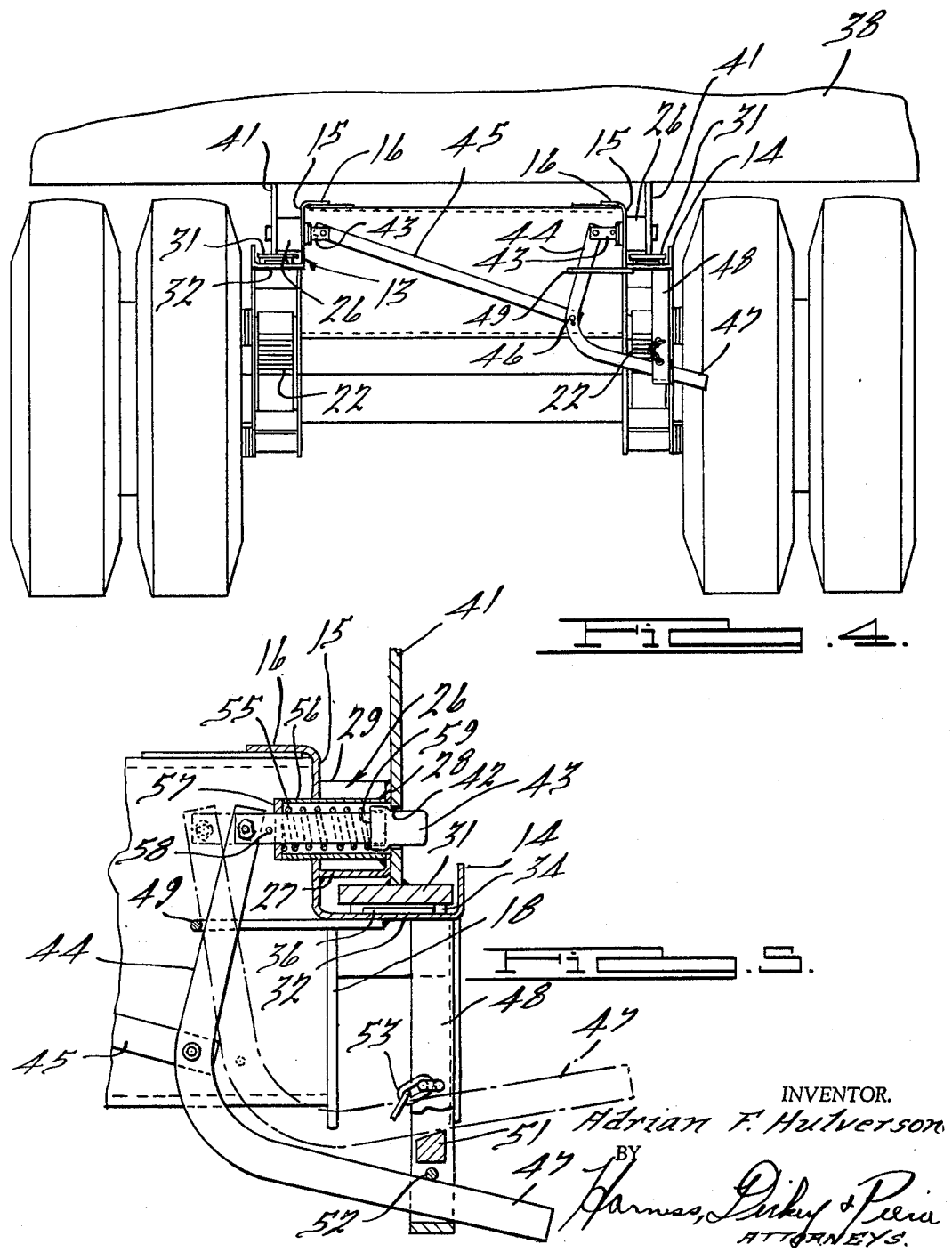

United States Patent Office 3,502,345
Patented Mar. 24, 1970

3,502,345
SLIDING VEHICLE SUBFRAME
Adrian F. Hulverson, Grosse Pointe Woods, Mich., assignor to Fruehauf Corporation, Detroit, Mich., a corporation of Michigan
Filed Feb. 26, 1968, Ser. No. 708,378
Int. Cl. B62d 21/00; B60g 11/04
U.S. Cl. 280—81                                  8 Claims

ABSTRACT OF THE DISCLOSURE

The sub-frame of the present invention has the wheels, such as those for a semitrailer, mounted thereon to form a wheeled unit with brakes thereon. The sub-frame is slidable relative to spaced flanges on the bottom of a semitrailer body or container which, when located relative to each other is locked in fixed relationship.

CROSS REFERENCE TO RELATED APPLICATION

Reference may be had to the patent application to A. F. Hulverson, Ser. No. 651,907, filed July 7, 1967, now Patent No. 3,425,710, for a sub-frame having inflatable tubes for raising rollers on plates into engagement with the spaced bottom flanges of a semitrailer body or container so that relative movement may occur therebetween.

SUMMARY OF THE INVENTION

The sub-frame of the present invention has forward, rearward and intermediate channel shaped cross members joined together at the ends by longitudinally extending supporting channels which have flanges for extending over the top of the cross member ends. Gusset plates engage the top flange of the cross members and the top flanges of the supporting channels, all of which are welded together. Forward, rearward and intermediate hangers are secured to the underside of the supporting channels and to the ends of the channel cross members. The hangers have cross webs which engage the ends of the leaf spring units which are secured to a pair of spaced axles which support the tandem wheels and the sub-frame. Bosses extend inwardly from the flanged wall of the supporting channels under which the flanges on the container or body extend when the flanges slide thereunder as they are advanced on pads on the bottom web of the supporting channels until they are in a predetermined relation to the sub-frame. This relationship is such that a pair of spring pressed pins in oppositely disposed bosses can be moved into locked position with the flanges. Suitable mechanism is provided for withdrawing the pins to release the flanges and for advancing the pins into locked position therewith.

BRIEF DESCRIPTION OF THE DRAWINGS

FIGURE 1 is a broken view in elevation of a sub-frame of the present invention with a semi-trailer body or container mounted thereon;

FIG. 2 is a plan view of the structure illustrated in FIG. 1;

FIG. 3 is an enlarged, broken sectional view of the structure illustrated in FIG. 2, taken on the line 3—3 thereof;

FIG. 4 is an end view of the structure illustrated in FIG. 2, as viewed from the point 4 thereof with parts omitted, and FIG. 5 is an enlarged, broken sectional view of the structure illustrated in FIG. 1, taken on line 5—5 thereof.

DESCRIPTION OF THE PREFERRED EMBODIMENT

The sub-frame of the present invention has three channel shaped cross members 10, 11 and 12 with the channel 10 facing rearwardly and the channels 11 and 12 facing forwardly. Longitudinally extending supporting channels 13 and 14 have inner legs 15 extended and flanged inwardly at 16. The legs 15 abut the ends, and the flanges 16 extend over the top, of the channel cross members. Gusset plates 17 are welded to the top flange of the cross members 10, 11 and 12 and to the underside of the top flanges 16 of the supporting channels 13 and 14 to provide a rigid construction. Hangers 18, 19 and 21 are welded to the underside of each of the supporting channels 13 and 14 having hard transverse webs which engage the top leaf of the sets of leaf springs 22 at their outer edges. The leaf springs are supported on axles 23 secured thereon in the usual manner by U-bolts 24. The ends of the cross members 10, 11 and 12 are welded to the sides of the legs 15 and to the inner face of the hangers to provide strength thereto. The hangers 18 and 19 may be further strengthened by gusset plates 25. The brakes, the operating mechanism therefor, torsion bars and other elements of the wheel units are of standard construction and are not described further as they form no part of the present invention.

The opposite ends of the supporting channels 13 and 14 have stampings 26 welded to the inner face of the legs 15. The stamping 26 has a bottom flange 27, an outer flange 28 and two side angularly disposed flanges 29. The stampings 26 prevent a supporting flange 31 from moving upwardly any substantial amount away from a bottom web 32 of the supporting channels 13 and 14. As illustrated in FIG. 3, the bottom webs 32 have slide pads 34 of brake lining or like material removably secured thereto by screws 35. Forwardly and rearwardly of the pads 34 metal plates 36 are welded to the webs 32 to protect the ends of the pads 34 when the flange 31 is advanced thereover. It will be noted in FIG. 3 that the forward end of the flange 31 is sloped at 37 to permit the flange to ride up over the metal plates 36 and onto and over the pads 34. Such a sloped end 37 may be provided on both the forward and rearward end of the flange 31 so that the sub-frame can be moved relative to the flanges either forwardly or rearwardly. It will be noted in FIG. 1 that a rear cross member 39 on a container or body 38 can be unbolted and removed to permit the sub-frame to slide rearwardly from the container or body. The container or body 38 has the flanges 31 supported on vertical plates 41 which are secured to the bottom thereof. The two flanges 31 are supported in this manner in parallel relation from the front to rear of the container in alignment with the supporting channels 13 and 14. This permits the flanges to move on the pads 34 until apertures 42 in the plates 41 are aligned with locking pins 43 carried in the forward stampings 26, as clearly illustrated in FIG. 5. The pin 43 in the stamping 26 of the supporting channel 14, as illustrated in FIG. 4, is connected to a link 44 while the pin 43 in the opposite channel 13 is connected to a link 45 which is secured to the link 44 by a pivot 46. The link 44 has a right angle handle portion 47 extending through a U-shaped bracket 48 in which it is swung outwardly and upwardly to retract the pins 43 from the apertures 42 in the plates 41. To assure the retraction of both of the pins, a U-shaped wire stirrup 49 has the two extending legs welded to the underside of the supporting channel 14 with the link 44 therebetween. The handle 47 moves the link 44 to retract the engaged pin 43 and strike the web of the stirrup 49. The further movement of the handle will pull the link 45 and retract the opposite pin 43. When both of the pins are retracted, the handle 47 may be moved onto the top of a lug 51 which maintains the pins 43 in the retracted position to permit the plates 41 to slide past the stampings 26. A pin 52 on a chain 53 may be inserted through apertures in the U-shaped bracket 48 when the pins 43 are in locking position to prevent the pins from being accidently withdrawn.

The supporting plate 41 and flange 31 are secured to the underside of the container or body lengthwise thereof to be aligned with the longitudinally extending supporting channels 13 and 14 of the sub-frame. Pads on the bottom web 32 of the supporting channels 13 and 14 substantially reduce the friction produced by sliding the flanges 31 of the container or body forwardly or rearwardly in the supporting channels. When the sub-frame is moved rearwardly, the rear cross member 39 is removed from the container or body to permit the relative forward movement of the body 38 and the supporting channels 13 and 14 to remove the sub-frame from the container or body. In the same manner, the sub-frame may be advanced under the container or body when the cross member 39 is removed which is replaced thereafter. When the sub-frame has been moved in supporting position, the locking pins 43 are aligned with the apertures 42 in the plates 41 and upon the release of the handle 47 from the boss 51, the pins 43 will be inserted in the apertures 42. A spring 55 is carried in a tube 56 secured within the forward stamping 26 when extending through an aperture in the wall 15 of the supporting channels 13 and 14 with the outer end closed by a washer 57 through which the pins 43 extend. A stop pin 58 may be provided through the locking pins 43 to limit the forward movement of the end thereof. The inner end of the spring 55 rests against the washer 57 while the outer end rests against a shoulder 59 adjacent to the end of the pins. The springs 55 urge the pins 43 through the aperture 42 to lock the sub-frame to the container or body. The outwardly and upward movement of the handle 47 withdraws the pins 43 from the apertures 42 against the tension of the springs 55 which retains the handle in pin retracted position when resting on the boss 51.

What is claimed is:

1. In a sub-frame for supporting a container or body, cross members of channel shape, longitudinally extending supporting channels having one side extended and flanged in a direction away from said supporting channel, the extended sides engaging the ends of the cross members with the flanges extending over the top thereof, pads within the supporting channels secured to the bottom thereof, and flanges on the member to be supported aligned with the pads for sliding movement thereover.

2. In a sub-frame as recited in claim 1, wherein the flanges on the members are mounted on vertical plates which are secured to the bottom thereof.

3. In a sub-frame as recited in claim 2, wherein bosses project outwardly from said extended sides above the bottom of the supporting channels under which the flanges on the members extend when supported in the channels.

4. In a container as recited in claim 3, wherein the vertical plates have an aperture therethrough, and pins carried by a pair of oppositely disposed bosses which extend through said apertures to lock the flanges within the supporting channels.

5. In a sub-frame as recited in claim 4, wherein a lever system connected to said pins has a handle portion by which the pins are withdrawn from the apertures.

6. In a sub-frame as recited in claim 5, wherein spring means interconnected with said pins and lever systems urges said pins into said aperture.

7. In a sub-frame as recited in claim 6, wherein a U-shaped element limits the movement of one portion of the lever system to cause both of the pins to be retracted when the system is completely operated.

8. In a sub-frame as recited in claim 7, wherein a U-shaped element receives the handle portion of the lever system which is secured in pin retracted position by a boss within the element against which the handle portion is urged by said spring means.

References Cited

UNITED STATES PATENTS

| | | | |
|---|---|---|---|
| 2,717,707 | 9/1955 | Martin. | |
| 2,831,700 | 4/1958 | Sheppard et al. | 280—405 X |
| 2,831,735 | 4/1958 | Bennett et al. | |
| 2,900,194 | 8/1959 | DeLay | 280—34 |
| 2,993,728 | 7/1961 | Beran et al. | |
| 3,087,741 | 4/1963 | DeLay | 280—81 |
| 3,102,738 | 9/1963 | DeRoshia | 280—415 |
| 3,365,211 | 1/1968 | Ginsburg | 280—81 |
| 3,372,946 | 3/1968 | Hutchens | 280—81 |

KENNETH H. BETTS, Primary Examiner

U.S. Cl. X.R.

280—34, 104.5